Sept. 23, 1969   E. D. MUMAW   3,468,031

TOOTH EXTRACTOR AND METHOD

Filed July 21, 1967

INVENTOR.
EVERETT D. MUMAW

BY Watts, Hoffmann,
Fisher & Heinke

ATTORNEYS

United States Patent Office 3,468,031
Patented Sept. 23, 1969

3,468,031
TOOTH EXTRACTOR AND METHOD
Everett D. Mumaw, 2717 Edgehill Road,
Cleveland Heights, Ohio 44106
Filed July 21, 1967, Ser. No. 655,015
Int. Cl. A61c 3/14
U.S. Cl. 32—61                        9 Claims

ABSTRACT OF THE DISCLOSURE

Teeth are extracted by imbedding and adhering an exposed portion of a tooth in a potting compound within a container that fits over the tooth, and then applying forces to the tooth through the compound.

Cross reference to related application

The application is a continuation-in-part of copending application Ser. No. 524,999, filed Jan. 24, 1966, entitled Stomatological Method, now Patent No. 3,332,150, issued June 25, 1967, which in turn is a continuation-in-part of application Ser. No. 261,399, filed Feb. 27, 1963, entitled Stomatological Method and Device, now abandoned. Reference is also made to commonly owned application Ser. No. 522,518, filed Jan. 24, 1966, entitled Instrument for Loosening Teeth With High-Frequency Vibrations, now Patent No. 3,332,149, issued July 25, 1967, which is a companion application to the above first-mentioned application.

Background of the invention

This invention relates to methods and apparatus for extracting teeth using a potting compound.

In the extraction or separation of a tooth from the surrounding alveolar bone, the method of engaging the tooth has, in practice, remained essentially unchanged over the years. One basic method of engagement has been used, that is, engaging a portion of the tooth with an instrument at one or more individual points. All forceps, tongs, and the like in current and past use are so designed. For example, conventional dental extraction forceps apply gripping pressure to a tooth when the forceps are squeezed. While the tooth is gripped in this manner a rocking or prying action is used to loosen and remove the gripped tooth from the mouth of a patient. Not only must the dentist apply and maintain constant hand pressure on the forceps, but also the forceps contact the tooth and apply the pressure only at two or three points on the tooth because of the irregular shape of the tooth and construction of the forceps. The area of contact is normally insufficient to transmit a twisting action from the forceps to the tooth, yet such a twisting action is often desirable in initially loosening the tooth. Also, due to the small area of forcep contact, the gripping forces are concentrated and high localized pressures are produced. These pressures tend to break all but a strong, healthy, tooth at some point in the coronal portion, making it more difficult to remove the root or other remaining portion of the tooth. Also, when a tooth is broken during extraction a noise that is rather unpleasant if not frightening to the patent is produced, all of which is undesirable.

The medieval key and those instruments in forms now generally classed as elevators represent only a slight variation from this. They contact the tooth at one point and their method of action, rather than to solely utilize the operator's arm or wrist, is to tip, pry, elevate or lift the tooth from its socket by placing the fulcrum of the action against an adjacent portion of the intra-oral anatomy. The method of engaging the tooth, however, has not changed; only the type of instruments, the materials used in their construction, and the techniques of their use have changed along with corresponding changes in metallurgical technology. Presently, a dentist learns the use of over three hundred different extraction instruments and normally must purchase many of these at considerable expense when he enters practice.

Summary of the invention

The present invention provides a convenient and effective way to engage and apply forces to a tooth without exerting high localized pressures that would tend to break the tooth and which readily permits twisting forces to be applied. In addition, broken teeth which are otherwise difficult to grasp with forceps or the like can be removed. This method involves engaging or grasping the whole coronal surface of the tooth simultaneously. Thus the strain or pressure of the instrument applied to the tooth is spread or distributed evenly over the whole extra-gingival surface of the tooth, instead of one or more concentrated individual points of pressure.

In accordance with this invention a potting compound is used to firmly adhere an exposed portion of a tooth in the mouth of a patient to an extracting instrument for applying forces to the tooth. The term "potting compound" as used herein includes materials that are initially soft, i.e., flowable, or that can be softened, as by applying moderate heat, and which thereafter will harden as by curing or cooling and will bind or adhere a tooth within a container in which the compound is located when a tooth is imbedded in the compound. Suitable compounds include acrylic resins, epoxy resins, adhesives or cements, dental impression compounds, and the like. In the case of ultrasonic type instruments as disclosed in the aforementioned copending applications, a material such as silicone can be used, which does not inhibit ultrasonic wave transmission. Thus, several different types of materials are contemplated.

A container or cup is used to hold the potting compound around a tooth. The container is sized to fit over the crown of the tooth to be extracted. While the compound is flowable the tooth is imbedded in the compound within the container. The compound is then allowed to harden and firmly anchors the tooth within the container. The container attaches to or is a part of a handle or other manipulating means, forming an extracting instrument. Through manipulation of the container and compound, the imbedded tooth is loosened and extracted. With a substantial portion if not the entire crown area imbedded in the compound, the tooth is adhered to the instrument rather than squeezed and the manipulative forces are spread over a large area of the tooth. Also, twisting forces can be transmitted from the instrument to the tooth. Even where the tooth is already broken, the potting compound adheres to any portion of the tooth extending above the gum so that the remaining portion can be extracted.

A container or cup used to contain the potting compound encircles the extending portion of the tooth to be extracted. It is tubular in shape, formed of a continuous thin metal band, open at one end to fit over the tooth and having an opposite reinforcing end portion that connects the band to a dental tool. It is contemplated that the dentist will introduce the potting compound into the container and around the tooth after the metal band is placed about the tooth and before a covering device for attaching a handle is applied to the band; or, alternatively, the compound can be placed into the container and the container then pressed over the tooth. In the latter case the container can be supplied already containing the potting compound, which if hard will be softened before applied or if soft will be applied and then cured.

Handles of various designs can be used to apply forces to the container and imbedded tooth. While normally a different handle shape will be required for upper and lower teeth and for teeth in different locations, an adjustable handle or a handle with separate heads that hold the container or cup can be provided to facilitate extracting teeth in different locations.

Several advantages that result from this method are: (1) a tooth is less likely to crack, split or break during extraction, (2) as long as any portion of a broken or decayed tooth remains extragingivally in position, the tooth is more readily grasped, (3) extraction or movement forces are applied evenly to the whole portion of the tooth which projects extragingivally into the mouth, (4) the number of individualized extraction instruments can be reduced to the bare minimum and most dental forceps now in use will not be necessary, (5) this instrument will be most convenient, light, and space saving, making it portable and therefore applicable, for example, for an astronaut's dental kit or for military surgical kits, and (6) costs to the dentist and patient can be reduced.

Accordingly, it is an object of this invention to provide improved methods and apparatus for extracting a tooth from the mouth of a patient, using a potting compound. Other objects, features and advantages of this invention will become apparent as the invention becomes better understood by reference to the following detailed description when considered in conjunction with the accompanying drawing briefly described below.

Description of the preferred embodiments

Figure 1:
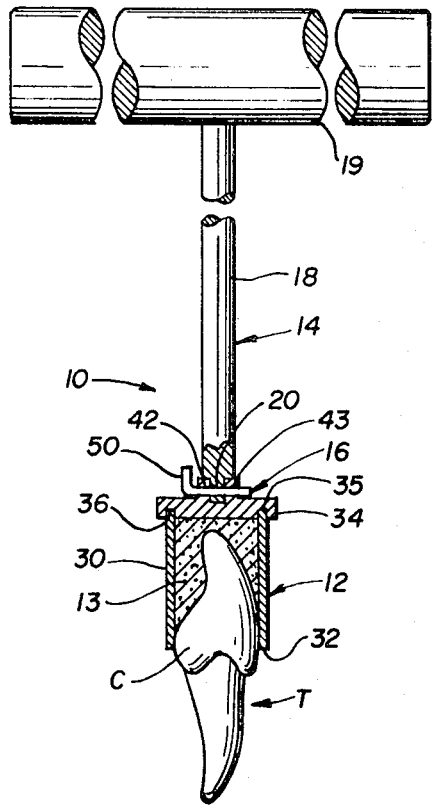
FIGURE 1 is an elevational view, with parts in section, showing a tooth extracting device embodying the present invention.
Figure 3:
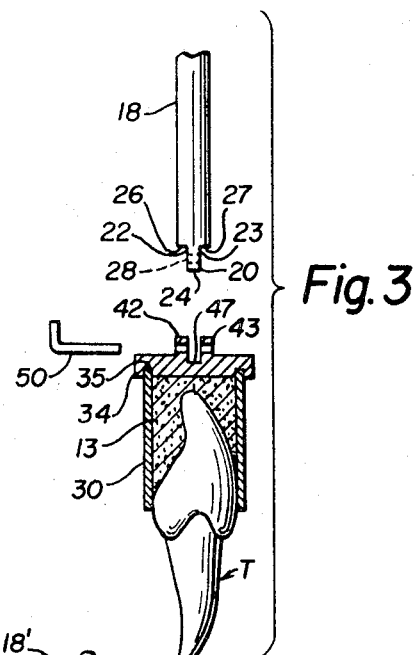
FIGURE 3 is an exploded partial elevational view, with parts in sections, of the device of FIGURE 1.
Figure 2:
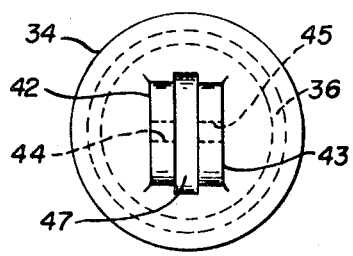
FIGURE 2 is a top plan view of a container portion of the device of FIGURE 1, with the handle removed.

Referring now to the drawing, a dental instrument 10 is shown embodying the present invention. As best shown in FIGURES 1-3, the instrument 10 includes a container 12 containing potting compound 13 for gripping a tooth, and a handle 14 for manipulating the container 12. A connection 16 is provided between the handle and container to removably secure the two together. With this arrangement, the container can be placed over a tooth to be extracted without the handle attached. Once the potting compound has set, the handle can be attached and the tooth etxracted. Thereafter, the container and handle are separated and the handle is then used with other containers.

The handle 14 is generally T-shaped, and includes a shaft 18 with a cross bar 19 at one end forming a hand grip and a narrow tongue portion 20 at the other end to be received by the container 12. The tongue portion 20 extends across the diameter of the shaft 18 in one transverse direction but is thinner than the shaft, having two flat sides 22, 23. The end 24 of the tongue 20 is flat and two flat shoulders 26, 27 are formed where the flat sides 22, 23 join the shaft 18. A through-bore 28 extends through the tongue, opening through the flat sides 22, 23. This construction serves to rigidly connect the handle 14 to the container 12, as will be described below. Typically, the handle is made of stainless steel so that it can be autoclaved.

The container 12 is generally cup-like and is constructed of a size and shape to fit over the coronal portion C of a tooth T. The container 12 is formed of a thin continuous metal band or sleeve 30 that is tubular in shape and generally circular in transverse cross section, although this shape may vary depending upon the shape of the tooth to be extracted. For example, oval shapes are desirable for teeth having thin coronal portions, such as the incisors. Typically, the band is formed of aluminum, copper, steel or other alloy and can be distorted somewhat if necessary, at least at the open end that receives the tooth, in order to closely fit about a particular tooth. The band is thin enough that it can be forced between the tooth to be extracted and any adjacent tooth when it is placed about the tooth to be extracted. One end 32, the lower end in the orientation of FIGURES 1 and 3, of the tubular metal band 30 is open to receive the coronal portion of a tooth. A metal mounting plate 34 fits over an opposite end 35 and has a continuous groove 36 that receives the end 35 of the band or sleeve 30. The plate 34 is secured to the band by the potting compound 13, which is placed within the band 30, as will be explained below. Once the potting compound sets, the mounting plate and band are rigidly connected. The groove 36, shown as circular, conforms in plan to the cross sectional shape of the endless band 30 and thus would be oval if an oval band is used.

Two ears 42, 43 extend from the mounting plate 34 and are spaced apart the width of the tongue portion 20 of the handle 14. Aligned through-bores 44, 45 extend through the ears 42, 43, respectively, spaced above a flat seating surface 46 between the ears a distance that aligns the through-bores 44, 45 with the through-bore 28 of the handle when the end 24 of the tongue is flush against the seating surface 47.

As shown in FIGURE 1, when the tongue portion 20 of the handle 14 is seated between the ears 42, 43, the through-bores 44, 45 are aligned with the through-bore 28 and a pin 50 extends through the ears and tongue portion, rigidly connecting the mounting plate 34 to the handle 14. Because the flat end surface 24 of the tongue portion 20 is flush with the flat seating surface 47 of the plate 34, relative movement about the pin 50 is prevented. This connection provides a straight extracting instrument.

Figure 4:
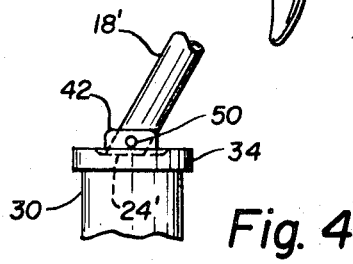
FIGURE 4 is an elevational view of a modified embodiment similar to the device of FIGURE 1.

An alternative form, the so-called contra-angle form, of the instrument is shown in FIGURE 4. This instrument is identical to that of FIGURES 1-3 except that a shaft 18' is provided having a tongue portion 20' with an end surface 24' that is angularly related with the longitudinal axis of the shaft 18'. This causes the shaft 18' to extend at an angle from the longitudinal central axis of the tubular band 30 and hence at an angle from the longitudinal axis of a tooth to be extracted. Other types of handles can also be used with the containers 12, including adjustable handles that facilitate extraction of teeth at different locations in the mouth, including upper and lower teeth.

Figure 5:
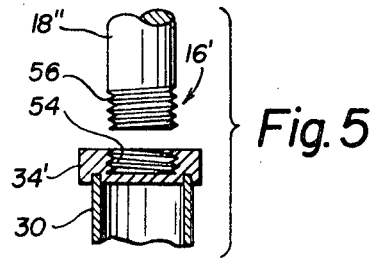
FIGURE 5 is an exploded partial elevational view, with parts in section of another embodiment of the container portion, similar to the device of FIGURE 1.

An alternative connection 16' between a mounting plate 34' and a shaft 18" is shown in FIGURE 5 of the drawing. The mounting plate 34' includes a threaded bore 54. A threaded end portion 56 of the handle shaft 18" is received in the threaded bore 54. This arrangement provides a rigid connection between the container and handle and eliminates the need for a third connecting member, such as the pin 50. However, it facilitates twisting movement in only one direction unless a locking member, such as a key or pin, is provided. Other socket type connections can also be used, as long as a positive attachment of the handle and container is provided. A suitable socket type connection for attaching a container 12 to an instrument is disclosed in the aforementioned copending application Ser. No. 524,999, now Patent No. 3,332,150 along with an instrument for loosening a tooth with high-frequency vibrations, which disclosure is hereby incorporated herein by reference.

In lieu of the cups or containers described, standardized aluminum shell crowns, as furnished to the dental profession for temporary crowns by manufacturers such as Kerr Manufacturing Company and others can be used satisfactorily. These are closed at one end and completely open at the other end, are very inexpensive and may be used once and discarded. A slot or other attachment means for a handle is provided at the closed end.

In use, the endless band 30 is forced over the coronal portion of a tooth to a position as shown in FIGURE 3. At this stage the plate 34 is not yet in place. A suitable potting compound 13 such as Impression Compound No. 2 Soft Green manufactured and sold by the Kerr Manufacturing Co. is heated to a softened condition and packed into the tubular band or sleeve 30 about the coronal portion of the tooth. The plate 34 is then pressed onto the edge 35 of the band or sleeve 30, which extends beyond the outer end of the tooth. The plate not only packs the potting compound 13 tightly around the tooth, but also is thereby placed in firm contact itself with the potting compound. Within several minutes the compound cools and hardens and adheres the band or sleeve 30, the mounting plate 34 and the tooth tightly together. Other suitable quick-setting potting compounds such as those already mentioned can be used in place of the impression compound specified above and may be initially flowable and catalyzed to cure in situ when mixed and packed into the band 30 about a tooth. For example a two-component plastic cement (which polymerizes when a monomer and copolymer are mixed) such as the cement sold by Amco Corporation and designated F80 can be used, as can cement of the common oxyphosphate type, such as S. S. White Zinc Cement, which hardens when powder and liquid portions are mixed.

Once the potting compound has hardened by cooling or curing, the handle 14 is connected to the mounting plate 34 by inserting the tongue 20 between the ears 42, 43, with the flat end surface 24 flush with the seating surface 47 of the plate 34. The pin 50 is then inserted through the through-bores 44, 45 of the ears and the through-bore 28 of the tongue to connect the container 12 to the handle 14. The dentist then grasps the hand grip 19 and manipulates the tooth, as by applying a twist and pulling on the tooth, and thereby extracts the tooth held by the container 12 from the mouth of the patient. The container 12 is then removed from the handle 14 and may be discarded in its entirely or the sleeve 30 can be removed from the plate 34 so that the plate can again be used.

As mentioned above, this method can be practiced by placing a container already containing potting compound over the crown of the tooth to be extracted and pressing it is place so that the tooth crown is imbedded in the compound. The compound is then allowed to harden and the tooth extracted as already described. The method can also be practiced by manipulating a container, compound and imbedded tooth with a powered instrument such as the instrument disclosed in the aforementioned application Ser. No. 524,999, now Patent No. 3,332,150.

It will be apparent from the above that with the present apparatus and method, a tooth is firmly adhered to an extracting instrument in a manner that applies forces over a large area of the tooth, so that the tooth can be twisted and pulled with minimum danger of breakage.

While preferred embodiments and methods of practicing this invention have been disclosed with particularity, it will be apparent that modifications or alternations may be made therein without departing from the spirit and scope of the invention, as set forth in appended claims.

I claim:
1. A method for extracting teeth using a potting compound which is initially soft, i.e., flowable, or which can be softened and which subsequently will harden or set, said method comprising the process of extracting a tooth from an oral cavity with said compound without applying substantial gripping pressure to the tooth, including the steps of placing a container for potting compound about an exposed portion of a tooth in an oral cavity and imbedding the portion of the tooth within the container in a flowable potting compound, allowing the potting compound to harden or set and thereby fasten the imbedded portion of the tooth to the container, and thereafter extracting the said tooth from the mouth of the patient by manipulating the container without clamping the tooth.

2. In a method of extracting a tooth from the mouth of a patient, the steps of connecting an instrument for extracting a tooth to the tooth by imbedding a portion of the tooth in a potting compound carried by the instrument and allowing the compound to harden or set, and then extracting the tooth from the mouth with the instrument.

3. The method of claim 2 including the step of twisting the tooth with the instrument about a longitudinal axis of the tooth and also exerting a force along the longitudinal axis of the tooth to extract the tooth from the mouth of the patient.

4. The method of claim 3 including the steps of imbedding the tooth portion in a potting compound that will effectively transmit forces at high-frequencies and twisting the tooth about said longitudinal axis at high frequencies of oscillation.

5. A method of extracting a tooth from an oral cavity, the steps of which include firmly connecting a tooth extracting instrument to a tooth with an adhesive material thereby applying no compressive gripping pressure to the tooth, extracting the tooth by applying forces to the tooth with the instrument through the adhesive that only move the tooth relative to its position in the oral cavity and which do not independently compress the portion of the tooth connected to the instrument.

6. A dental instrument for extracting teeth through an adhesive connection therewith, comprising a cup-like member to closely fit over a coronal portion of a tooth, said member including a thin sleeve portion constructed to encircle an exposed portion of a tooth and to be adhered by a potting compound, having an open end that receives said tooth and an opposite closed end that extends the outer end of the tooth and means on said closed end for connecting the cup-like member to a manipulating member for applying forces through the cup-like member to extract a tooth.

7. An instrument as set forth in claim 6 including potting compound within the container.

8. An instrument as set forth in claim 9 including a manipulating member for applying forces to said container, a separate plate forming said opposite closed end having a continuous groove in one side receiving the sleeve and connecting means on the other side attaching an end of said manipulating member to the container.

9. An instrument as set forth in claim 6 including a handle removably attached to said container and constructed to be grasped by hand to manipulate and extract a tooth.

References Cited
UNITED STATES PATENTS

| | | | |
|---|---|---|---|
| 2,930,124 | 3/1960 | Pos | 32—12 |
| 2,154,499 | 4/1939 | Eisenstein | 32—12 |
| 3,085,336 | 4/1963 | Kesling. | |
| 3,091,857 | 6/1963 | Rubin. | |

F. BARRY SHAY, Primary Examiner

H. DINITZ, Assistant Examiner

PO-1050
(5/69)

UNITED STATES PATENT OFFICE
CERTIFICATE OF CORRECTION

Patent No. 3,468,031                    Dated  September 23, 1969

Inventor(s)  Everett D. Mumaw

It is certified that error appears in the above-identified patent and that said Letters Patent are hereby corrected as shown below:

Column 1, line 70, "type" should be -- types --.

Column 5, line 49, "is" (first occurence) should be -- in --.

Column 6, line 44, after "hered" insert -- thereto --;

line 46, after "tends" insert -- across --;

line 52, "9" should be -- 6 --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents